United States Patent [19]
Ackermann et al.

[11] 3,986,191
[45] Oct. 12, 1976

[54] APPARATUS FOR DEVELOPING DIAZO TYPE FILM

[75] Inventors: Carl A. Ackermann; Patrick F. McPherson, both of Deep River, Conn.

[73] Assignee: Blu-Ray, Incorporated, Essex, Conn.

[22] Filed: Jan. 22, 1974

[21] Appl. No.: 435,473

Related U.S. Application Data

[62] Division of Ser. No. 59,553, July 30, 1970, Pat. No. 3,804,515.

[52] U.S. Cl. .............................. 354/299; 354/300; 354/324
[51] Int. Cl.² ......................................... G03D 13/00
[58] Field of Search ............ 354/297, 299, 300, 317, 354/324, 325, 331, 337, 338, 340

[56] References Cited
UNITED STATES PATENTS

| | | | |
|---|---|---|---|
| 3,081,687 | 3/1963 | Takats ................. | 354/317 |
| 3,149,550 | 9/1964 | Lohse et al. ............ | 354/299 |
| 3,364,833 | 1/1968 | Mulvany ................ | 354/300 |
| 3,440,944 | 4/1969 | Endermann et al. .......... | 354/300 X |
| 3,524,397 | 8/1970 | Hruby .................... | 354/300 X |
| 3,535,997 | 10/1970 | Blake .................... | 354/300 X |

FOREIGN PATENTS OR APPLICATIONS

| | | | |
|---|---|---|---|
| 641,204 | 1/1937 | Germany ................ | 354/300 |
| 567,200 | 2/1945 | United Kingdom ........... | 354/331 |

*Primary Examiner*—Fred L. Braun
*Attorney, Agent, or Firm*—Arthur M. Lieberman; James M. Rhodes, Jr.

[57] ABSTRACT

In a diazo developer apparatus which includes a chamber, slightly larger than the film to be developed, having continuously circulating ammonia gas uniformly distributed in the film area, ammonia gas entry and exit ports, a temperature control device for the chamber, and elements in the chamber for preventing the film being processed from closing the exit port. The gas is derived from a container holding a predetermined amount of liquid ammonium hydroxide through which the gas exiting from the chamber is bubbled. The gas is derived from the container above the liquid level and fed directly to the chamber.

4 Claims, 5 Drawing Figures

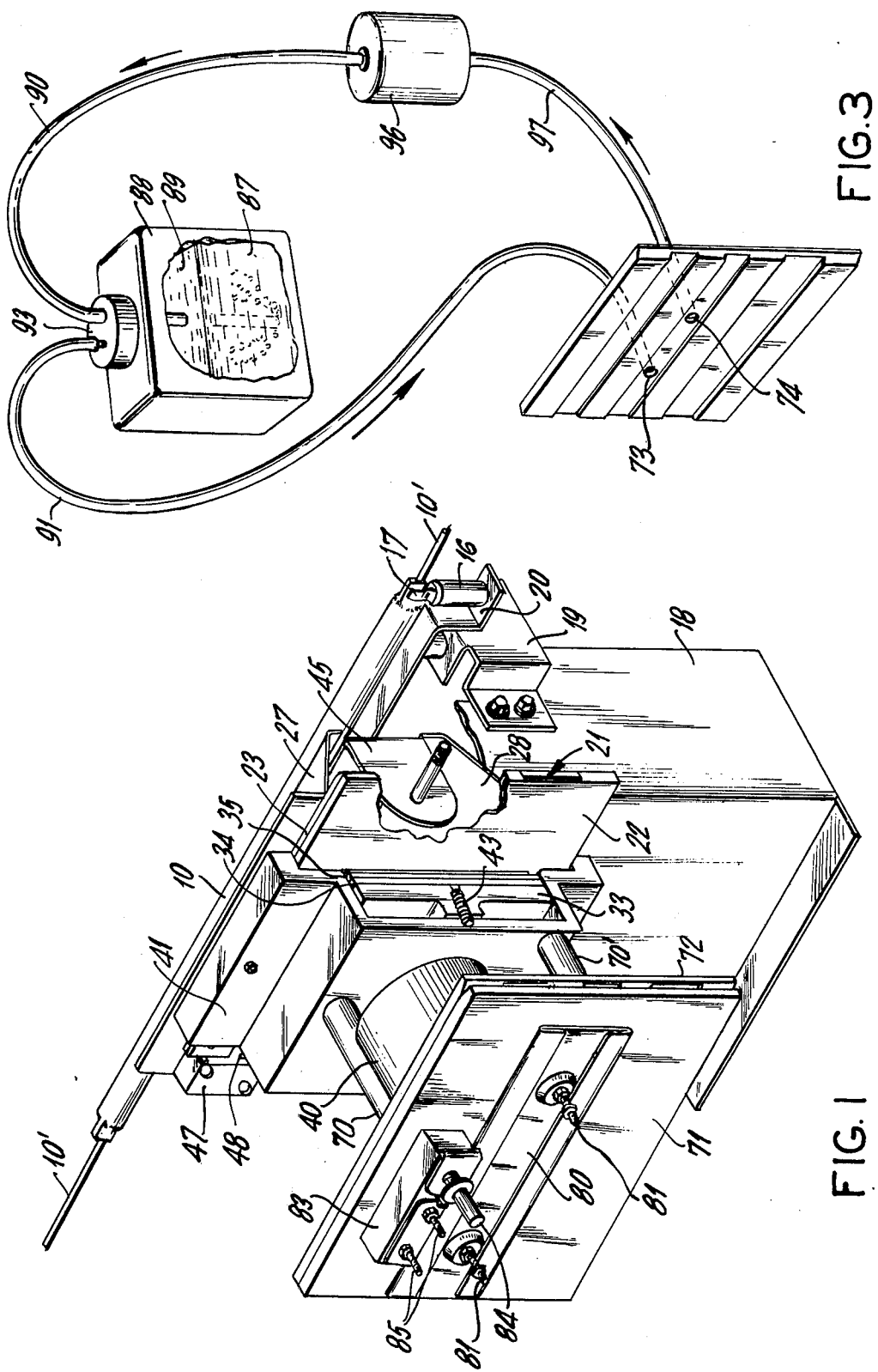

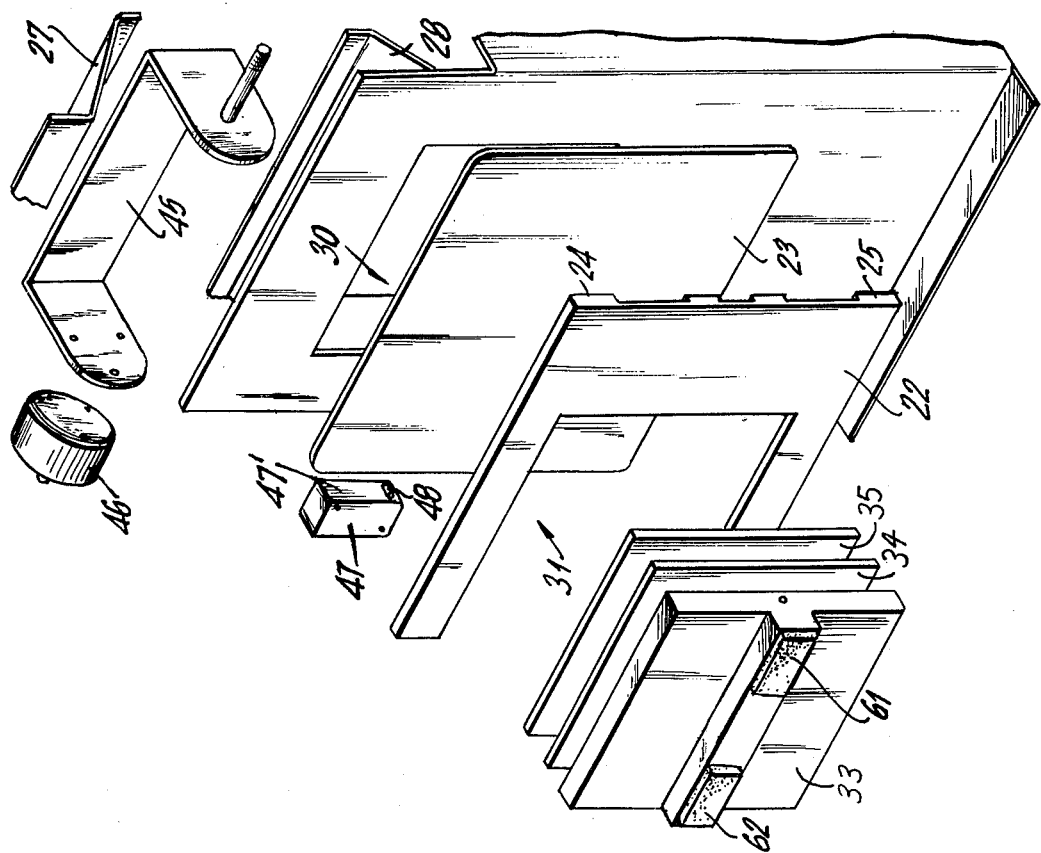
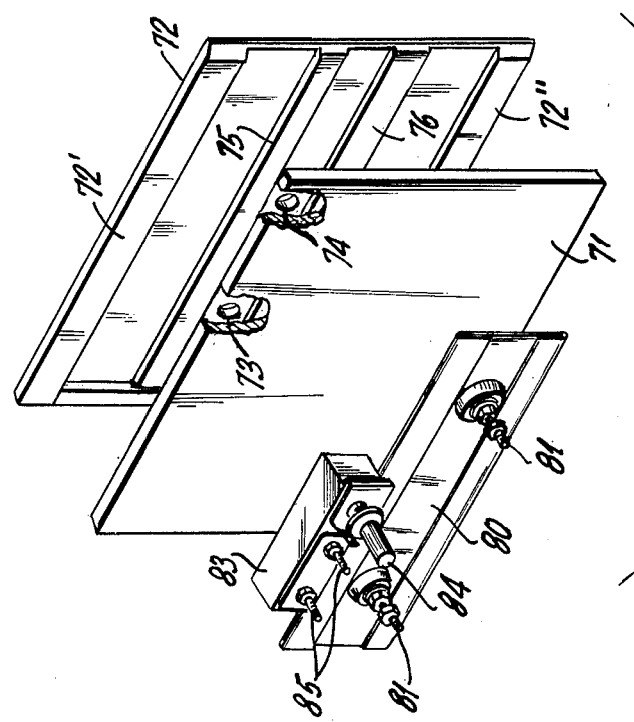
FIG. 2b
FIG. 2a

APPARATUS FOR DEVELOPING DIAZO TYPE FILM

This is a divisional application of application Ser. No. 59,553, filed July 30, 1970, which issued on Apr. 16, 1974 as U.S. Pat. No. 3,804,515.

BACKGROUND OF THE INVENTION

The diazo type process requires a transluscent original and involves the exposure of a sensitized emulsion coated upon either one or both sides of an acetate or polyester film; diazo materials also include emulsions on paper and cloth. Emulsions on both sides of the film permits the development of more intense images and increases the quality of the projected light.

The development of diazo type materials is generally a function of time, temperature, and, with most materials, the ambient humidity. Most systems employ anhydrous ammonia, in steel cylinders, as the developing agent. A separate container storing water provides the humidity. Such systems must of necessity be semi- or fully automatic with considerable controls, both valve and timing, to ensure proper flow of ammonia at constant pressure as the tank pressure reduces with use. The conventional exposure of diazo type materials is likewise complicated and requires extremely close and uniform spacing between the original and the sensitized film because of the high resolution requirements of the reduced size images. Thus far, commercial arrangements tend to be extremely complex and cumbersome.

OBJECTS OF THE INVENTION

It is the object of this invention to provide a diazo type copier which is simple in its mechanism and operation.

It is a further object of this invention to provide such an exposure unit which is fully automatic upon the insertion of the original and sensitized film and in which a significant size exposure window is controllable via a small shutter displacement.

It is a further object of this invention to provide a developer unit for diazo type exposed film to which ammonia gas of substantially uniform composition and humidity may be circulated simply and economically without the escape of ammonia gas to the area around the developing apparatus.

It is a further object of this invention to provide such a developer unit with a uniformly elevated temperature.

The above mentioned and other features and objects of this invention and the manner of attaining them will become more apparent and the invention itself will best be understood by reference to the following description of an embodiment of the invention taken in conjunction with the accompanying drawings, the description of which follows:

FIG. 1 is a perspective illustration of the exposure and developer units;

FIGS. 2a and 2b are exploded detail perspective views of the developer unit and exposure unit, respectively, shown in FIG. 1;

FIG. 3 is a combined perspective and schematic showing the apparatus causing the flow of ammonia to and from the developer unit.

DETAILED DESCRIPTION OF THE INVENTION

Figure 4:
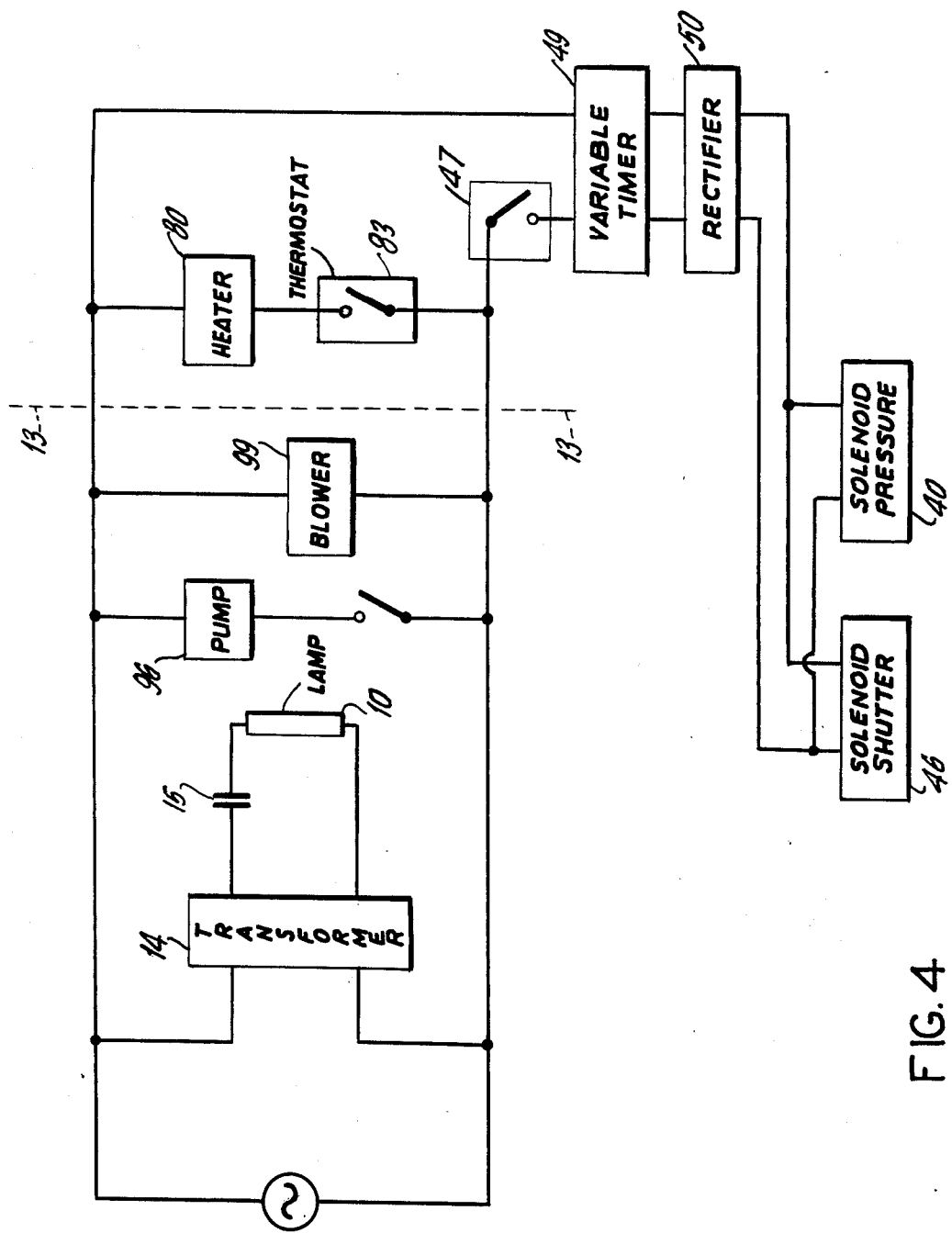
FIG. 4 is a schematic illustration of the electric control circuits for the copier.

Turning now to the invention, and in particular to FIGS. 1, 2a and 2b, the exposure unit and developer unit components will be described in detail. Omitted from these views are adjunct circuitry such as the ballast and capacitors, electronic timing circuit, and blower. While these elements are not shown physically, since they are well known, their relationship in circuit as an aid to understanding the overall concept may be seen by reference to FIG. 4.

Inasmuch as one of the more costly elements of the copier is the ultra-violet source 10, it is expedient to provide a complete redundancy in the exposure and developer units (i.e., two or more of each). This may be visualized in FIG. 2 by mirror imaging the perspective view along the lamp axis. This arrangement affords an opportunity for two operators to work simultaneously side by side on the same unit. It also greatly reduces the size and cost of what is effectively two copiers by using certain circuitry in common. The common circuitry may be seen to the left of a dashed line 13—13 in FIG. 4. For simplicity of discussion, only a single developer and exposure unit shall be explained hereinafter.

The ultra-violet source 10 is an electric gaseous discharge type lamp, preferably of the tubular mercury type having an output of, for example, 85 watts per inch, and is supplied with electric energy at its connectors 10' via transformer 14, which acts as a ballast, and capacitor 15 (see FIG. 4). The lamp is mounted upon stand-offs 16 bearing clips 17. While in this view only one such stand-off clip set is shown, the other set is similarly disposed at the other end of the lamp 10. A simple base support 18 carries associated mounting brackets 19 and 20 which in turn support the lamp stand-offs (again, only the near end brackets are shown in the figure).

The particular unit being described is dimensioned for apertured type IBM cards, a conventional arrangement wherein the diazo film is mounted over a rectangular opening located at one end of the IBM card. Such an opening may, for example, be 35×45mm. It is to be clearly understood, however, that the invention pertains to any mounting method or size and is not to be deemed restricted to the use of apertured cards; the invention contemplates unmounted film as well.

The aperture-card is inserted into a guide formed by an opaque member 22 (which may, for example, be of aluminum) and a transparent platen 23 (of, for example, glass). Channel 21 in the guide may be simply formed by end flanges 24 and 25 of the opaque member 22.

Housing 18 includes suitable light shields 27 and 28 to confine the passage of the ultra-violet light to and through a window 30 (in the housing), platen 23, and a window 31 in opaque member 22. In particular, these light shields are so formed to generate in cross-section a triangle, the apex of which is closed by the shutter 45 which is rotatably mounted in base 18 under control of rotary solenoid 46. Solenoid 46 is selected to give an angular displacement to shutter 45 sufficient to remove it from light interfering relation with the film when the latter is positioned in window 31. This arrangement, it may be seen, permits a short stroke solenoid (or, by analogy, a rotary solenoid) to control the striking of light over a significant area (the window), by means of a relatively small shutter displacement.

A pressure plate comprising a base member 33 and pads 34 and 35 is arranged for linear thrust against platen 23 through the aperture 31. In order to assure uniform thrust and pressure against the platen, it has been found preferable to employ a first layer of silicon sponge 34 cemented to the base. Cemented to the sponge layer is a layer of neoprene 35. The pressure plate position is controlled by solenoid 40 in conjunction with return springs 43 (the remote spring while not shown is similarly positioned at the rear). The movable member of the solenoid which passes through bracket 41, on which the solenoid is mounted, is affixed to the base 33 by any convenient means. Return of the pressure plate to a position remote from the platen is accomplished by the return springs 43 which are in tension between mounting bracket 41 and the base 33 of the pressure plate. Any tendency for noisy return of the pressure plate upon de-energization of the solenoid may be eliminated by a pair of cushions 61 and 62 which may be of any conventional spongy type material. To reduce any tendency of the pressure plate to wear due to its passage through the window 31 or due to repeated impacting upon the platen 23, and to enhance pressure uniformity, it has been found preferable to bevel the sponge and neoprene layers as they extend from the base member 33.

Control of this solenoid and solenoid 40 is automatic and is initiated, as will be explained, by micro-switch 47. Micro-switch 47 is mounted to project its switch button 48 in interfering relation in the end of the channel formed between members 22 and 23. When the cards are introduced into this channel and before they reach their final position where the sensitized film and original appear at the windows 30 and 31, the ends of the cards encounter switch button 48 whose bias gently restricts further motion of the cards. Upon additional finger pressure to the cards, switch button 48 is depressed and the cards come to rest against the face 47' of the microswitch 47.

Turning our attention now to FIG. 4, it may be seen that the closing of this micro-switch energizes the variable timer 49. Timer 49, which may be any conventional electronic, mechanical, or electro-mechanical device which fulfills the current carrying capacities, timing duration and other functional requisites described, dictates the exposure time of the diazo sensitized film upon which a copy is being made. The suggested variability for this timer is between 1 and 15 seconds.

Through its normally closed contact, the variable timer 49 energizes rectifier 50 (d.c. operation being preferable) which is employed to energize the shutter and pressure solenoids 46 and 40, respectively. Thus, although the operator has released his finger pressure on the inserted cards, the cards are now held firmly against the platen 23 by the pressure plate, thereby maintaining the micro-switch in the closed position. During the same period, the shutter 45 has been angularly displaced to permit the passage of ultra-violet energy through the windows to the film to be exposed. When the timer 49 has run its cycle, its contents open, de-energizing the solenoids and permitting the normal spring pressure of micro-switch button 48 to thrust the cards outwardly thereby indicating to the operator the conclusion of this cycle. The diazo type material in the copy card has now been properly exposed.

It has been found preferable during this stage of the process to dispose the master and copying card emulsion side to emulsion side to reduce the image divergence to an absolute minimum. The original, of course, is placed on the lamp side of the copy.

Offset by three suitable standards 70, 70' and 70" (the third standard being at the apex of an equilateral triangle formed by the three and not shown in the view of FIG. 1) is a portion of the developing unit. Opposed plates 71 and 72 form a chamber therebetween (by virtue of the end flanges 72' and 72") which is utilized for the circulation of ammonia gas. Plate 72 includes a pair of gas ports used, respectively, for the entry and exit of the ammonia. Flanking the ports are ribs 75 and 76 of lesser height than flanges 72' and 72". These ribs function to prevent an inserted card from being sucked up against and closing the gas exit port which is at reduced pressure. The height of these ribs depends upon the pressure utilized, the distance between them, and the flexibility of the card.

Plate 71 has mounted thereon an electrical heating unit 80 including connectors 81 for coupling to the a.c. source. As will be appreciated, the heater rating depends upon the heat-sink capability of the chamber formed by plates 71 and 72, and has been found preferably to be of such a size as to produce a continuous and constant generation of 170° F. To stabilize the temperature, a thermostat 83 is mounted on element 71 remote from the heating unit to accurately sense the chamber temperature. Thumb manipulative screw 84 permits easy variation of the thermostat to the selected temperature. As may be seen in FIG. 4, thermostat 83 is connected (via connectors 85) in series with heater 80 across the a.c. source. The chamber formed by plates 71 and 72 has bevelled edges at the receiving end to permit easy insertion of the exposed card for developing. The exposure unit may likewise be bevelled. Alternatively, guide sleeves may be positioned to aid entry of the cards into the respective units. The remote end of the chamber may be opened or closed (shown closed).

Gas circulation to the developing chamber is effected as shown in FIG. 3. Liquid ammonium hydroxide 87 is stored in a closed container 88 with a space 89 at the top. Two coupling hoses are hermetically connected to the container, one of which 90 is brought near the bottom of the container to ensure the continuous contact of the open end of the hose with the liquid. Hose 91 which directly couples the container to gas entry port 73 (by any conventional connecting means at the chamber end) is connected to the top of the container 93 in such a manner so as to prevent its entry into the container. This arrangement, which may be provided by a male nipple (not shown) in the container top, prevents any leaking of liquid into the system. Pump 96, which may be any conventionally available pump, is arranged to force the ammonia gas in the direction of the arrows. It will be appreciated that as the pump is connected on its vacuum side to gas exit port 74 by hose 97, the transmission of gas within the chamber will be between ports 73 and 74.

The described port and pump arrangement has been found to emit no detectable ammonia gas from the developing chamber, yet provides a continuous replenishment of ammonia, the ammonia being continuously bubbled through solution and being forced into hose 91. For a chamber size of approximately 4 inch height × 5 inch length × 0.025 inch width, a pump capable of pumping 150 cubic inches per minute has been found sufficient. It has also been found that since the re-circulation of ammonia gas takes place through the liquid, a satisfactory humidity level is automatically maintained. Further, since ammonia fills the chamber prior to card insertion, fresh gas is always present on both sides of an inserted card; the circulation then continues in the presence of the card.

While when using 26° Baume ammonium hydroxide, four seconds has been found sufficient for full development of an inserted card. As is known to those versed in the copying field, no timing arrangement is necessary in the developer unit since diazo film, as a practical matter, cannot be overdeveloped in an ammonia atmosphere.

For convenience, it is suggested that a separate on-off switch be inserted in series with the pump (see FIG. 4) so that in periods of non-use, the circulation of ammonia may be eliminated without shutting down the equipment entirely, thereby requiring a new warm-up cycle for reinitiation of use. The main on-off switch controls all the associated equipment as shown in FIG. 4, including a blower 99 which is disposed within the housing to force circulation around the various electrical elements and maintain their temperature within design limits.

What is claimed is:

1. In a diazo type developing apparatus wherein diazo sensitized exposed film is developed by exposure to ammonia gas which apparatus includes a chamber for receiving exposed film, the chamber having at least one ammonia gas entry port and one ammonia gas exit port, the chamber having a height and length sufficient to receive the film and having a minimum width sufficient to permit circulation of the ammonia gas therein about the film, means for heating the chamber to a predetermined temperature, means for circulating ammonia gas in the chamber including a closed container of ammonium hydroxide liquid coupled between the ammonia gas entry port and the ammonia gas exit port, the circulating means further including an input to the container disposed below the level of the liquid and an output from the container disposed above the level of the liquid and coupled to the gas entry port of the chamber, the circulating means still further including a pump coupled between the gas exit port of the chamber and the input to the container for bubbling ammonia gas through the liquid and circulating it between the chamber and the container; the improvement comprising means in said chamber for preventing exit port closure by the film when the pressure thereat is reduced during operation of the apparatus.

2. The improvement claimed in claim 1, wherein said closure preventing means comprises a pair of raised surfaces parallel to the direction of gas flow between said gas entry and gas exit ports and disposed with said ports intermediate said surfaces, said surfaces being of lesser height than the width of said chamber.

3. The improvement claimed in claim 1, wherein said chamber has a film receiving end and is closed at the end remote from the film receiving end thereof, the gas entry port being more proximate said remote end than the gas exit port.

4. The improvement claimed in claim 1, wherein said means for heating said chamber to a predetermined temperature comprises a heating element mounted on the outside of said chamber substantially centrally thereof and a thermostat disposed on said chamber at a remote portion from said heating element and coupled to said heating element for the control thereof.

* * * * *